United States Patent Office 3,437,618
Patented Apr. 8, 1969

3,437,618
WATER DISPERSIBLE POLYALKYLENE GLYCOL MODIFIED, NON-DRYING ALKYD RESINS
David D. Taft, Minneapolis, Minn., assignor to Ashland Oil & Refining Company, Ashland, Ky., a corporation of Kentucky
No Drawing. Filed Feb. 23, 1966, Ser. No. 529,238
Int. Cl. C08g 17/14
U.S. Cl. 260—22     1 Claim

ABSTRACT OF THE DISCLOSURE

A water-dispenrsible polyalkylene glycol-modified, non-drying oil alkyd resin consisting essentially of the following ingredients and their proportions by weight:

| | Percent |
|---|---|
| Non-drying oil | 10–40 |
| Polyhydric alcohol containing 2–8 hydroxyl groups per molecule | 10–40 |
| Polyoxyethylene glycol having a molecular weight from 600 to 6000 | 5–15 |
| Non-oxidizing, monobasic carboxylic acid, having 6 to 18 carbon atoms | 10–25 |
| Dicarboxylic acid or anhydride having 4 to 10 carbon atoms per molecule | 20–35 | and sufficient neutralizing agent to render said alkyd resin water-dispersible. Process for preparing the foregoing composition in which the ingredients are heated at a temperature of 350°–550° F. until the acid value is 5–30, followed by neutralizing the product and dispersing it in an aqueous medium. The product of this invention is a water-dispersible resin, well suited to form water-based paints or other coating compositions which will give clear, hard, glossy films on curing and without the development of surface imperfections.

---

This invention relates to water-dispersible resins, their preparation and use. In another aspect, the present invention relates to a novel, water-dispersible polyalkylene glycol-modified non-drying oil alkyd. In a further aspect, it relates to alkyd resins which have an improved stability in the dispersed state and are useful in the production of water-based paint. In another aspect, the present invention relates to a modified non-drying oil alkyd resin which possesses enough excess functionality to co-react with a suitable water-soluble cross-linking resin to produce a cured film.

Water-based paints are becoming increasingly popular as compared to organic solvent-based paints because of the many advantages which the water-based paints have to offer. These advantages include the reduction in fire hazard, reduction in odors, absence of expensive solvents, and the convenience of using water to thin the paint as well as to clean the utensils employed in the painting operation. Because alkyd resins are inherently hydrophobic, one of the chief difficulties in preparing water-based, modified alkyd resin paints has been to prepare an alkyd resin which can be dispersed in water without external dispersing aids and which will remain in that dispersed condition with a reasonable degree of stability.

Accordingly, the present invention is directed to a water-dispersible, non-drying alkyd. A major obstacle in the development of such a resin is in its application difficulties. Upon combination with a suitable cross-linking resin and subsequent curing, an ordinary water-dispersible, non-drying alkyd will yield a clear film which exhibits unusual surface imperfections. The most prevalent such imperfection is described by the artisan as pinholing or cratering. Theoretically, a water-dispersed resin system film forms craters because of the inability of the upper layers of film to wet the lower layers since, even in the center of most craters, a thin layer of film exists. Further, an additional factor which contributes to the cratering is the gel particle which is in the center of most craters. This heterogeneity of the system thus would relieve the stress caused by the shrinkage of the film from drying. In any case, nearly all films of water-dispersed non-drying alkyd resin systems have been beset by this problem on curing in the presence of a cross-linking resin.

It is, therefore, an object of this invention to provide a non-drying alkyd resin which will give clear, hard and glossy film on curing, which film is free from surface imperfections. It is another object of this invention to provide a process for preparing the novel water-dispersible alkyd resin of this invention. It is still another object of this invention to provide an aqueous dispersion of an alkyd resin in which the resin has an improved resistance to hydrolysis. It is an additional object of this invention to provide a non-drying alkyd which possesses enough excess functionality to co-react with a suitable water-soluble cross-linking resin (e.g., a melamine-formaldehyde resin) to produce a cured film having a highly cross-linked network.

The alkyd resin of this invention is readily dispersed in water after residual acidity of the resin is partially or completely neutralized. This alkyd resin exhibits improved properties when dispersed in a continuous aqueous phase in that the dispersed alkyd resin has an improved resistance to hydrolysis. If hydrolysis does occur, it causes an undesirable decrease in the viscosity and in the pH of the resin. Furthermore, it is not necessary to provide a protective colloid or other additive to assist in maintaining the dispersion of this alkyd resin. The alkyd resin of the present invention exhibits excellent mechanical and freeze-thaw stability in that the dispersed resin is readily combined with common pigments. In addition, the final paint, obtained from the alkyd resin, exhibits excellent freeze-thaw stability.

The objects of this invention are accomplished in accordance with this invention by providing an alkyd resin which consists essentially of the following ingredients on a weight basis:

| | Percent |
|---|---|
| Non-drying oil (or precursors thereof, i.e., fatty acid and polyhydric alcohol) | 10–40 |
| Polyhydric alcohol containing 2–8 hydroxyl groups/molecule | 10–40 |
| Polyoxyethylene glycols having a molecular weight from 600 to 6000 | 5–15 |
| Non-oxidizing, monobasic carboxylic acid, having 6 to 18 carbon atoms per molecule | 10–25 |
| Dicarboxylic acid or anhydride having 4 to 10 carbon atoms/molecule | 20–35 |

Insofar as the process of this invention is concerned, the foregoing objects are accomplished by providing, according to one aspect, a stepwise process for making the alkyd resin, in which process a portion of the foregoing ingredients are treated in a first step, and the remaining ingredients are added in one or more succeeding steps in the process. For example, the non-drying oil, the polyoxyethylene glycol, the non-oxidizing monobasic carboxylic acid, and 40 to 100 weight percent of the polyhydric alcohol are mixed and heated at a temperature of about 350° to 550° F., preferably 460° to 480° F., e.g., for an hour or longer, until the mixture has an acid value of 5 to 50, preferably 5 to 25. The remainder of the polyhydric alcohol and all of the dicarboxylic acid or anhydride are then added and the resulting mixture is heated at 350° to 550° F., preferably 400° to 480° F., e.g., for an hour or longer, until the acid value is 5 to 60, preferably 5 to 25.

In another aspect, the alkyd resin is made in a one-step process according to which all of the above-listed ingredients are charged and heated together at 350° to 550° F., preferably 400° to 480° F., until the mixture has an acid value of 5 to 60, preferably 5 to 25. Where the non-drying oil component is a natural oil, the step-wise process is preferred; however, where the non-drying oil component is actually to be formed in situ by charging the precursors thereof (i.e., fatty acid and triol), the one-step process is preferred. In any case, the alkyd resin product is then neutralized and dispersed at any desired viscosity in water to give an improved product of this invention.

If one were to make an alkyd resin from the ingredients listed above by employing the prior art or conventional alcoholysis procedure (according to which the polyhydric alcohol and non-drying oil would be reacted in a first step and the resulting alcoholysis product would then be reacted in a second step with further polyhydric alcohol, carboxylic acid or anhydride, and polyoxyethylene glycol), the resulting alkyd resin when neutralized would exhibit poor mechanical, freeze thaw, and storage stabilities. Contrariwise, by reacting the above-listed, resin-forming ingredients according to the step-wise or one-step processes of this invention, the resulting dispersions of the neutralized alkyd resins exhibit superior stability, as discussed above and as will be demonstrated hereafter.

The non-drying oils which are employed in this invention include any of the natural non-drying oils normally employed in the manufacture of alkyd resins. The term "non-drying oil" is used herein as meaning saturated glycerides of fatty acids (i.e., triglycerides) generally having 8 to 24 carbon atoms per molecule and inclusive of what is known in the art as non-drying oils, i.e., oils having an iodine value of less than 100. Suitable non-drying oils which can be used for this purpose representatively include vegetable oils, such as peanut oil, coconut oil, castor oil, olive oil, ouricuri oil, palm oil, teaseed oil, and the like, including mixtures thereof and animal oils, such as lard, tallow, and the like, including mixtures thereof. The preferred oil for reasons of convenience in supply and because of the quality provided to the final product is coconut oil or castor oil.

The amount of the oil which is employed in this invention can vary from about 10% to about 40% by weight of the final product, but preferably it is present in the range of about 15 to 30%. The term "non-drying oil" also includes the esters of unsaturated fatty acids having 8 to 24 carbon atoms and such triols as trimethylol ethane, trimethylol propane, and the like, where the mole ratio of fatty acid-to-triol is 3:1, so long as the ester has an iodine value of less than 100. It should be understood that it is within the scope of this invention to charge the drying oil as such or to charge its ester-forming precursors and form the ester in situ. Also, the non-drying oil component can comprise a mixture of various non-drying oils.

The polyhydric alcohol which is employed as an ingredient in making the non-drying oil-modified alkyd resin of this invention is one which contains at least two but not more than eight hydroxyl groups in a molecule and has from two to twelve carbon atoms. Typical examples of such a polyhydric alcohol include ethylene glycol, diethylene glycol, glycerine, trimethylol ethane, trimethylol propane, pentaerythritol, dipentaerythritol, tripentaerythritol, sorbitol, mannitol, and similar polyhydric alcohols which can be employed in the preparation of alkyd resins. Mixtures of these polyhydric alcohols can be used. Pentaerythritol is preferred because it not only enhances the drying properties of the dispersion of the neutralized resin but also when used will enable the dispersion to have a high non-volatile content and yet a desirable, workable viscosity, and paints made from such dispersion will have a desirable working consistency.

In the process of this invention, if the non-drying oil component used is a natural triglyceride, the polyhydric alcohol is preferably split into two portions for use in two separate steps of the process. The overall amount which is employed in the process varies from about 10% to about 40% by weight of the final product. Preferably, in the first step of the process approximately 60% of the total polyhydric alcohol is employed. This conveniently runs from about 5 to 18% by weight of the final product, and in the second step the remainder of the polyhydric alcohol is employed, namely from about 5 to 25% by weight of the final product.

The polyoxyethylene glycol which is employed in this invention is a compound having a long chain of repeating oxyethylene groups and a hydroxyl group at each end of the chain. This material may also be called a polyethylene glycol or a polyether glycol. In order for this material to be of the proper consistency to be employed in the process of this invention, it should have an average molecular weight which is from about 600 to about 6000. (This molecular weight is determined by the use of a phthalic anhydride-pyridine reagent as described in "Carbowax" Polyethylene Glycols, published by Union Carbide Co., p. 50 (1958). The amount of polyoxyethylene glycol which is employed in this invention is from about 5% to about 15% by weight of the total final product.

The non-oxidizing, monobasic carboxylic acid which is employed in this invention is one which has from about 6 to about 18 carbon atoms per molecule, and is intended to include the saturated aliphatic acids, the saturated cyclo-aliphatic acids, and the aromatic acids. Typical examples of the types of acids included are isodecanoic, isooctanoic, cyclohexanoic, cyclopentanoic, benzoic, p-tertiary butyl benzoic acids, and the long chain fatty acids derived from materials such as coconut oils, palm kernel oil, babassu oil, and others known to those skilled in the art. Mixtures of these acids can also be used. The preferred materials for this component of the invention are benzoic acid and p-tertiary butyl benzoic acid. The amount of these acids which is employed in the process of this invention is from about 10% to about 25% by weight of the total final product. The non-oxidizing, monobasic carboxylic acid is an essential resin-forming component in this invention and it contributes to the hardness of the cured alkyd resin; thus the tack-free time of the films of the resin is shorter.

The dicarboxylic acid or anhydride which is employed in this invention has 4 to 10 carbon atoms per molecule and includes the aliphatic, cycloaliphatic, and aromatic dicarboxylic acids, and their anhydrides. Specific compounds which are included in this group of materials are terephthalic, isophthalic, adipic, glutaric, azelaic, and phthalic acids and anhydrides. The amount of these materials which is employed in the process of this invention varies from about 20% to about 35% by weight of the final product.

It is particularly preferred in this invention to employ phthalic or isophthalic acid as the dicarboxylic acid or anhydride. The resins which are made employing isophthalic acids have a much greater resistance in the dispersed phase to hydrolytic cleavage than do resins made with the corresponding phthalic derivatives. Thus, alkyd resins of this type can be dispersed in water and made into water-based paints or other water-dispersed compositions which will not exhibit as great a decrease in viscosity or a lowering in pH over periods of storage time.

In the preparation of the alkyl resins of this invention, during the reaction of the resin-forming ingredients, a nitrogen blanket can be used where an alkyd resin of good color is desired. Also, during such reaction, an azeotropic solvent can be used to facilitate removal of by-product water. This use of solvent is conventional in alkyd preparations, the typical solvent used being xylene. Where residual amounts of such solvent hinder the subsequent water dispersibility of the resin, water miscible, inert solvents can be used instead. Typical of the water-miscible solvents which can be used for this purpose are various ethers and ether esters of ethylene glycol and diethylene glycol, such as Cellosolve acetate, diethyl Carbitol, dibutyl Carbitol, methyl Cellosolve acetate, Carbitol acetate, butyl Cellosolve acetate, and the like. In order to facilitate the esterification and transesterification reactions in the first step of the two-step process or in the one-step process, suitable alcoholysis catalysts can be used, such as cobalt naphthenates, litharge, and the like, and preferably lithium hydroxide.

The neutralization of the alkyd resin can be accomplished by adding a small amount of a neutralized agent to neutralize a portion or all of the remaining acid groups in the resin. Generally, the amount of neutralizing agent used will be that sufficient to neutralize 20 to 150%, preferably 50 to 90%, of the theoretical acid groups in the resin. The resin is then dispersed at any desired viscosity in water to provide a water dispersion containing 5 to 55 weight percent resin solids (non-volatile), which can then be transformed in an otherwise conventional manner into a water-based paint or other similar composition by the addition of suitable emulsifiable driers, e.g., manganese or cobalt, and pigments, e.g., zinc oxide, titanium dioxide, calcium carbonate, and the like.

Useful neutralizing agents which can be used include ammonia, ammonium hydroxide, and primary, secondary and tertiary mono- or polyamines, including hydroxyamines, and especially the lower alkylamines, such as ethylamine, butylamine, dimethyl amine, diethyl amine, tributyl amine, triethyl amine, triisopropanolamine, ethanolamine, dimethylethanolamine, butanolamine, and the like. Amines which are volatile at temperatures below 350° F., preferably 250° F., are preferred. The amines can be added in undiluted form to give essentially anhydrous neutralized resin products, which products will be capable of practically unlimited dilution or dispersion in water without being coagulated. Alternatively, the resins can be neutralized by adding them to dilute aqueous solutions of water dispersible amines. Inorganic neutralizing agents, such as potassium or sodium hydroxide or carbonates can also be used. Mixtures of neutralizing agents can also be used.

In a preferred embodiment of the step-wise resin-forming process, the first step of the reaction is accomplished by mixing coconut oil, pentaerythritol, a polyoxyethylene glycol, having a molecular weight of about 2800 to 3700 and benzoic acid or para-tertiary-butyl benzoic acid. The amount of coconut oil is 15 to 30% of the total weight of material added in the process. These materials are reacted under a nitrogen blanket at atmospheric pressure and at a temperature of 460° to 480° F. until the acid value of the material reaches a level of 5 to 25. This product is then esterified further by the addition of the remaining pentaerythritol and isophthalic acid (which optionally can be a mixture of isophthalic acid and phthalic anhydride), and heating the mixture under nitrogen at a temperature of 420° to 480° F. and at atmospheric pressure until the product has an acid value of 5 to 25. The material is then neutralized at 180° to 200° F. with triethylamine in an amount sufficient to neutralize 75 to 100%, preferably 90 to 100%, of the theoretical remaining acid groups in the product (based on the charge). The neutralized resin is then dispersed in water at about 130° to 180° F., preferably 140° to 150° F., to produce a water-dispersed resin having a high degree of resistance to hydrolysis.

Prior to use, or at the time of use, the dispersed alkyd resins of this invention are mixed with any water-soluble cross-linking resin (e.g., an aminoplast or phenolic resin) known to be useful in curing alkyds. Suitable cross-linking resins for the alkyds of this invention include the phenol-formaldehyde resins, urea-formaldehyde resins (e.g., a methylolated urea-formaldehyde resin), melamine-formaldehyde resins (e.g., a methylolated melamine-formaldehyde resin) and the like. Melamine-formaldehyde resins are particularly preferred as cross-linking agents for the alkyl resins of the present invention. Suitable water-soluble cross-linking resins for alkyd resins are known, and their selection and amount will be well within the skill of one routinely engaged in this art.

In application, an aqueous coating composition containing my alkyd resin and a suitable cross-linking agent is spread in film form on a suitable substrate (e.g., metal, paper, textiles and the like) and cured. Curing can be conveniently effected by heating at temperatures of from 215° to 375° F., usually 225° to 300° F. Rapid cures at higher temperatures, e.g., 425° F., can also be used. The cured films obtained from these aqueous coating compositions are characterized by excellent adhesion to the substrate, good flexibility toughness, and solvent resistance.

The present invention is further illustrated by the following specific examples, which include a preferred embodiment. Unless otherwise indicated, all parts and percentages are by weight and all temperatures are in degrees Fahrenheit. It is not intended that these examples shall limit the invention in any way whatsoever since they are intended merely to be illustrative of certain embodiments of this invention.

Example I

An alkyd resin was prepared from the following ingredients:

| | Parts by weight |
|---|---|
| Deodorized, refined coconut oil | 280 |
| Pentaerythritol | 160 |
| p-Tertiary-butyl benzoic acid | 268 |
| Polyoxyethylene glycol (M.W.=3000–3700) | 128 |
| Phthalic anhydride | 296 |
| Isophthalic acid | 106 |
| Pentaerythritol | 192 |

The first four ingredients above were charged into a reactor which was fitted with a thermometer, an agitator, and a water trap to which was attached a reflux condenser. The temperature was raised to 480° F. and maintained at that level until an acid value of 18 was obtained by testing the mixture. The resin was cooled and the remaining ingredients were added. The reaction was then heated to 480° F. and held there until an acid value of 15 was obtained. The reaction mixture was then cooled to 300° F. and dispersed in an aqueous solution of triethylamine, yielding a white, opalescent dispersion having a viscosity of 3040 cps., a pH of 7.9 and a non-volatile content of 42.5%.

On combination of the resin with a water soluble methylolated melamine resin (80% alkyd, 20% melamine resin based on non-volatile content), a clear film 3 mils in thickness was cast and baked for 30 minutes at 250° F. after a 15-minute flash-off period. The resultant cured film was glossy, flexible and displayed excellent adhesion and solvent resistance properties. The film exhibited a Sward hardness of 44%.

Examples II–VI

Alkyd resins, prepared according to the procedure of Example I, were prepared from the following ingredients and possessed the following properties:

TABLE I

| Example No. | II | III | IV | V | VI |
|---|---|---|---|---|---|
| Trimethylol ethane | | 31 | | | |
| Coconut oil | 372 | 186 | 786 | 186 | 186 |
| Mono-pentaerythritol | 160 | 46 | 495 | 80 | 80 |
| p-Tertiary-butyl benzoic acid | 268 | 89 | 801 | 89 | 89 |
| Polyoxethylene glycol: | | | | | |
| M.W.=3,000–3,700 | 140 | 70 | 420 | | 70 |
| M.W.=1,000–2,000 | | | | 95 | |
| Isophthalic acid | 456 | 228 | 1,368 | 228 | 241 |
| Phthalic anhydride | | | | | |
| Mono-pentaerythritol | 215 | 108 | 441 | 74 | |
| Trimethylol ethane | | | 186 | 31 | 106 |
| 1st step acid value | 18.5 | 16.7 | 16.1 | 12.0 | 17.2 |
| Final acid value | 9.5 | 8.6 | 9.5 | 13.4 | 10.7 |
| Viscosity (at 60% non-volatile solids in xylene) | 85.4 | 80.2 | 477 | 9.6 | 14.6 |
| Gardner-Holdt color | 4–5 | 3–4 | 4 | 3 | 3–4 |
| Water dispersion properties: | | | | | |
| Non-volatile (wt. percent) | 41.4 | 40 | 39 | 38 | 41 |
| Viscosity (cps.) | 3,720 | 9,050 | 16,600 | Pasty | 28,000 |
| pH | 8.0 | 7.52 | 7.1 | | 7.5 |
| Sward hardness of 3 mil film | 28 | 32 | 42 | 18 | 26 |

NOTE.—All amounts, except when otherwise indicated, are in parts by weight.

In all examples, the ingredients selected from the first six materials listed above were reached at 470 to 490° F. until the desired acid value was reached. The remaining ingredients were then added, and the reaction was continued at 470° to 490° F. until the desired acid value was reached.

The resulting resin was dispersed into water as in Example I. The aqueous resin solution was then blended with 20% (based on solids) of a water-soluble methylolated melamine resin. A 3 mil film of the resulting resins was cast and baked for 30 minutes at 250° F. after a 15 minute flash-off period. In all examples, the baked films were clear, glossy and exhibited fair to good xylol and caustic resistance.

It can be noted from the examples that varying materials and amounts thereof can be utilized in forming the resins of this invention. Acceptable properties were shown by all of the resins produced.

Various modifications and alterations of this invention will become apparent to those skilled in the art without departing from the scope and spirit of this invention, and it should be understood that this invention is not to be limited to the preferred embodiments set forth herein for illustrative purposes.

What is claimed is:

1. A process for preparing a water-dispersible polyalkylene glycol-modified non-drying oil alkyd resin consisting essentially of the following ingredients and their proportions by weight:

| | Percent |
|---|---|
| Glyceride or ester non-drying oil having an iodine value of less than 100 | 10–40 |
| Polyhydric alcohol having 2–8 hydroxyl groups per molecule | 10–40 |
| Polyoxyethylene glycol having a molecular weight from 600 to 6,000 | 5–15 |
| Non-oxidizing, monobasic carboxylic acid having 6 to 18 carbon atoms per molecule | 10–25 |
| Dicarboxylic acid or anhydride having 4 to 10 carbon atoms per molecule | 20–35 | the process consisting essentially of heating said glyceride or ester non-drying oil, said polyoxyethylene glycol, and said non-oxidizing monobasic carboxylic acid, and approximately 40% of said polyhydric alcohol at 350° to 500° F. in a first processing step until the mixture reaches an acid value of 5 to 30, cooling said mixture, and adding the remaining polyhydric alcohol and the dicarboxylic acid or anhydride, and heating the resulting mixture in a second processing step at 350° to 550° F. until the mixture reaches an acid value of 5 to 30, and neutralizing the resulting product.

References Cited

UNITED STATES PATENTS

| | | | |
|---|---|---|---|
| 2,634,245 | 4/1953 | Arndt | 260—22 |
| 3,001,961 | 9/1961 | Armitage et al. | 260—22 |
| 3,077,459 | 2/1963 | Hershey et al. | 260—22 |
| 3,127,377 | 3/1964 | Lindenauer | 260—22 |
| 3,128,260 | 4/1964 | Langstroth | 260—22 |
| 3,223,659 | 12/1965 | Curtice et al. | 260—22 |
| 3,297,605 | 1/1967 | Schroeder et al. | 260—22 |
| 3,329,634 | 7/1967 | McWhorter et al. | 260—22 |
| 3,379,548 | 4/1968 | Jen | 260—22 |

DONALD E. CZAJA, *Primary Examiner.*

R. W. GRIFFIN, *Assistant Examiner.*

U.S. Cl. X.R.

260—20, 21, 29.2, 29.3, 29.4, 32.4, 32.6; 117—134, 139.5, 155, 167